US012675660B1

(12) United States Patent
Chong

(10) Patent No.: US 12,675,660 B1
(45) Date of Patent: Jul. 7, 2026

(54) STORYTELLING AI PROOF OF ATTENDANCE SYSTEMS AND METHODS

(71) Applicant: Wing Shing Wilson Chong, Wanchai (HK)

(72) Inventor: Wing Shing Wilson Chong, Wanchai (HK)

( * ) Notice: Subject to any disclaimer, the term of this patent is extended or adjusted under 35 U.S.C. 154(b) by 0 days.

(21) Appl. No.: 19/078,304

(22) Filed: Mar. 13, 2025

(51) Int. Cl.
| | |
|---|---|
| *G06K 19/06* | (2006.01) |
| *H04L 9/00* | (2022.01) |
| *G06Q 10/40* | (2026.01) |

(52) U.S. Cl.
CPC . *G06K 19/06056* (2013.01); *G06K 19/06037* (2013.01); *H04L 9/50* (2022.05); *G06Q 10/40* (2026.01)

(58) Field of Classification Search
CPC ........ G06K 19/06056; G06K 19/06037; H04L 9/50
USPC ......................................................... 235/494
See application file for complete search history.

(56) References Cited

U.S. PATENT DOCUMENTS

| | | | |
|---|---|---|---|
| 11,436,616 B2 | 9/2022 | Hwang et al. | |
| 2022/0261794 A1 | 8/2022 | Mavromatis et al. | |
| 2023/0195855 A1* | 6/2023 | Mavromatis | ............ G06F 21/10 |
| | | | 705/51 |
| 2024/0042328 A1* | 2/2024 | Meyers | ................. A63F 13/812 |
| 2024/0086701 A1 | 3/2024 | Ciecko et al. | |
| 2024/0256691 A1* | 8/2024 | Hwang | ................. G06Q 20/389 |
| 2024/0380619 A1* | 11/2024 | Ho | ............................ H04L 9/50 |

* cited by examiner

*Primary Examiner* — Michael G Lee
*Assistant Examiner* — David Tardif
(74) *Attorney, Agent, or Firm* — W&P International LC; Wai P. Leung

(57) ABSTRACT

The invention relates to a storytelling AI Proof of Attendance (POAP) system that integrates digital and physical tokens to commemorate significant family events. The system includes a Koseki registration system, a ceremonial application on smart personal devices, and blockchain technology. A Kamon personalization engine allows users to create custom family crests, which are minted as NFTs representing attendance and participation. The system uses IPFS for secure storage and retrieval of autobiography media, ensuring data preservation. Smart contracts manage ongoing relationships, enabling family members to contribute and access ceremonial data. QR codes with embedded images link physical objects to digital records, facilitating easy verification and sharing on social media. The invention blends traditional family heritage with modern technology, fostering community and pride through meaningful, authenticated tokens that capture and preserve family histories.

7 Claims, 5 Drawing Sheets

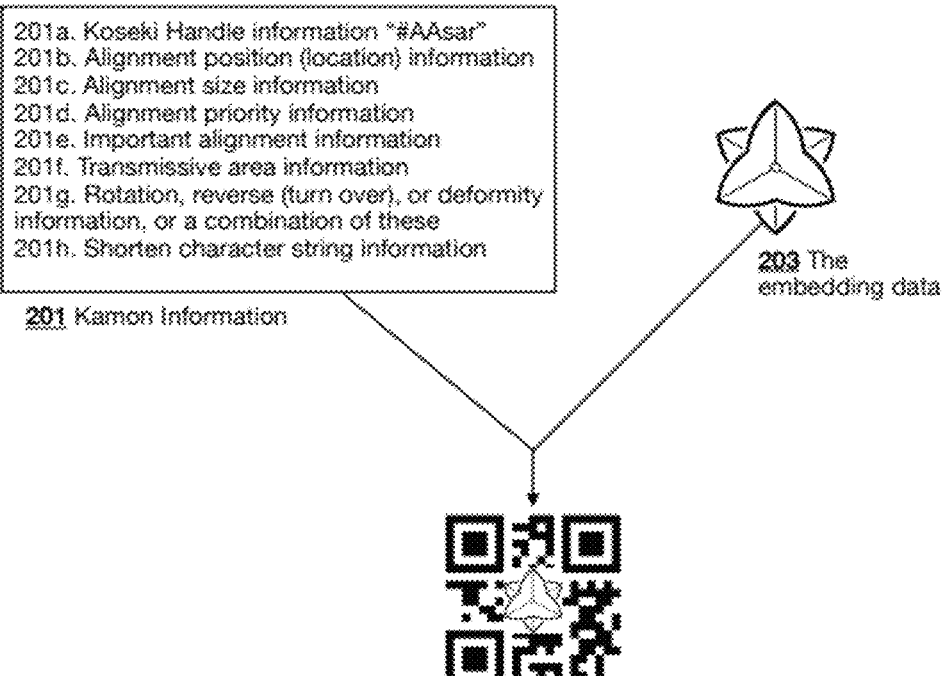

201a. Koseki Handle information "#AAsar"
201b. Alignment position (location) information
201c. Alignment size information
201d. Alignment priority information
201e. Important alignment information
201f. Transmissive area information
201g. Rotation, reverse (turn over), or deformity information, or a combination of these
201h. Shorten character string information <u>201</u> Kamon Information <u>203</u> The embedding data <u>205</u> 2D code that has character information of "#AAsar"

FIG. 2

STORYTELLING AI PROOF OF ATTENDANCE SYSTEMS AND METHODS

FIELD OF THE INVENTION

The invention relates to methods and systems for processing electronic data into a permanent physical object.

BACKGROUND

Millennials have been dubbed the generation of "instant gratification". Imaging experiences are typically based upon softcopy images viewed on their computer or their smartphone and shared with family and friends via a collection of social media sites. This in itself has created new forms of rich social sharing. Images, and the comments associated with them, have become the new tokens of social exchange and a core aspect of modern social media. Users can share moments of their day with a network of friends and have them respond to their images, and even share images of their own.

While Social Media sharing is a positive experience for many people, at the end of the day, this sharing is ephemeral. A growing body of data suggests Millennials deeply admire their parents and grandparents, search for meaning and authenticity, and look to the past as a guide to a present that is so filled with changes. Above all, the Millennial generation is looking for tradition and a sense of rootedness, searching for something that is time-tested and remains true in an era of change. This desire for membership or belonging provides an opportunity for advanced Koseki relationship management, enticing desired behaviors by increasing the level of pride felt by Koseki members. The term Koseki literally means 'membership of a household'. Each Koseki registry consists of one family unit, wherein a household is defined as a registered unit that may include extended family and nuclear family. Koseki communities must mutually recognise their historically grounded and validated contribution to continue the household lineage. A Koseki registry should evoke more pride of membership with connections made with its history and origin. Connections could potentially be made between the Koseki community and significant social others, with the aim of deepening its associations with meaningful social relationships, for instance, by embedding its consumption into social rituals or communal consumption, even gift-giving. Pride of membership is linked to a Koseki registry's ability to help members construct social roles and high social status. Many use social comparison to gauge the extent of their achievement.

Given Koseki consciousness, registrants see in a Koseki registry the possibility of improving their standing in their social environment. A prevailing Koseki consciousness is a concern with how one's family appears to the surrounding social world. Koseki registrants perceive themselves as members of the larger family unit, rather than as individuals. Public access to one's Koseki record lists data on other household members as well, thus instills a sense that one's background and family history are potentially open for all to see. Families shape their household unit so that it presents itself positively to the surrounding social world. New Koseki member registration is thus a collateral effect of family-centered decisions. Data on one member reflects on the entire family unit, so individual members often make life choices in consideration of all involved; not only fellow Koseki members but also the present and future surrounding social environment.

Social interaction is guided by a desire to achieve recognition and avoid the disrespect of others. The bestowal and denial of household positions reflect a struggle for recognition and the right that derives from registered household membership. For a child, it is the individual rights it acquires by becoming registered. For existing registrants, who enjoy these individual rights, it is also the ability to control access to their particular register.

A Kamon is often referred to as a family crest, created to serve as an unique emblem that represents a family's identity and to indicate one's historical origins; that is, one's family lineage, bloodline, ancestry and status. Kamon are handed down in each family, typically used on ceremonial occasions to add formality, especially in the temple or shrine registries of an ancestral hometown.

POAP stands for Proof of Attendance Protocol, a form of NFT that serves as mementos of attendance at important events. These can be minted by users with a secret link for free without paying a transaction fee. Mint links are unique links that entitle collectors to mint one POAP via the standard POAP claim flow. The term "minting" refers to the act of generating a POAP on the blockchain, whereas the term "POAP drop" refers to the act of distributing a POAP to recipients. A non-fungible token (NFT) is an asset that has been tokenized via a blockchain. A Kamon POAP is an NFT that represents a link to a Koseki heritage, a symbol of pride that gives instant gratification. Koseki members feel connected enough to a memorial ceremony to want to prove they were there. There was something special and fun about the ability to produce an instant social check-in from a moment that was captured. The immediate gratification often becomes the stimuli and focus of a social event. Such captured moments were often given to individuals at the gathering as a keepsake. These were real and lasting tokens of social exchange, not virtual ones.

The InterPlanetary File System (IPFS) is a protocol and peer-to-peer network for storing and sharing data (files, images, videos, websites) in a distributed file system. IPFS nodes contribute to the availability and stability of the services. More active nodes results in more benefits in terms of availability and redundancy. This system depends on nodes being willing and able to cache and share resources with the network. One goal of using IPFS is to preserve Koseki's history by letting members store autobiography media while minimizing the risk of that media being lost or accidentally deleted. IPFS uses content-addressing to uniquely identify each content in a global namespace connecting all computing devices. IPFS gateways are HTTP-based services that access content residing on the IPFS network, providing workarounds for applications, such as browsers, that have no native support for IPFS. An autobiography is served by its content address, and any other peers in the network can find and request that content from any node who has it using a distributed hash table (DHT). IPFS data is chunked into blocks, assigned a unique identifier called a Content Identifier (CID) that is computed by combining the hash of the data with a codec generated using Multiformats. Storage is finite, so nodes need to clear out some of their previously cached resources to make room for new resources. Hosting on the IPFS network itself costs electricity and bandwidth. Paid services allow a user to upload an autobiography to a remotely hosted IPFS node, and sponsor a pinning service to bear the cost of retaining access by pinning the autobiography on one or more nodes.

SUMMARY

The current embodiment of the system provides a platform for users to drive membership experiences within the Koseki registration system, and social media interaction outside of the system. In some embodiments, ways are developed to drive external registration requests to a Koseki registry, initiated by members who have accounts in other social networks. This could be done by establishing an account on the various social networking sites and allowing people to target input directly to that account-then taking that input and converting it to a registration request on the Koseki registry. Smart personal device 110, IPFS Gateway 100, and Kamon device 120 are the three primary elements where functionality and storage for a Koseki registry are hosted and combined in a system architecture to create an effective registration system. The current invention also supports a broadcast ceremonial model that lets those with large followings to share something tangible within the community. Kamon devices 120 are fabrication units that take a digital file pattern and create something that is tangible and has physical existence and persistence. The output of such a Kamon device 120 will be referred to as a memorial tablet. In one embodiment, a ceremonial application 130 on the smart personal device 110 would use the camera to capture an image of an emblem code prominently displayed on a memorial tablet to produce a powerful Jesa moment. This would be decoded and translated to identify the memorial tablet in question. Once identified, the ceremonial application 130 would enable autobiography media to be displayed to the user. A Koseki registration system runs IPFS gateways 100 to access autobiography media hosted at an IPFS node 180. Gateways 100 are just a convenient way of bridging the IPFS protocol stack with the standard experience of performing an HTTP request for some data. A Koseki member can run an IPFS node and pin autobiography content there, and share the corresponding IPFS hash for gateway 100 to load from the IPFS node 180. In some embodiments, Koseki members pay a Koseki registration system to pin autobiography content in their active nodes to keep autobiography media accessible. Children's names are added to the existing registry of their parents. A piece of autobiography media is accessed through gateway 100 via a URL with two parts: the gateway hostname and the request path. A Koseki registration system is not hosting that content and cannot take it down, but it can block the ability of users to view that content via the gateway 100 in appropriate circumstances. It is possible to create a Koseki handle 131 on the physical emblem code that would allow for a tie-back to the digital IPFS record of the emblem code's metadata. When scanned by the smart personal device's camera, it would be decoded into a Koseki handle 131 that allows the desired IPFS media to be displayed. In one embodiment, the Koseki handle may be an IPFS hash pointing to the autobiography media and, upon selecting the IPFS hash, the user's web browser may be redirected by the Koseki IPFS gateway 100 to the actual CID of the autobiography 168. After scanning by the user, a Koseki server node 180 associated with the Koseki handle information 201a embedded in the emblem code 205 shows or plays a visual and/or audio autobiography. A proof of play can be formed by recording the entire autobiography session in various levels of detail depending on the autobiography. By way of example, the ceremonial gateway 100 may include an Kamon personalization engine 137 for allowing an end user to select a particular Kamon design template 203 and add personalization data 140 (e.g., photos, messages, colors, etc), resulting in a personalized Kamon design 203. The personalized Kamon design 203 may be transmitted to a mint service 172 for minting (e.g., over the Internet) and may be dropped directly from the mint service 172 to recipients identified by the end user. The mint service 172 then accesses the mint job by selecting the mint link. In one embodiment, a mint link is provided for each entry in the guest list. Upon finishing playing an autobiography media, selecting the mint link may trigger the Kamon personalization engine 137 to create a POAP for the selected guest. Individuals can use ceremonial application 130 to upload a proof of play obtained by watching the media, and share Kamon POAP of a memorial ceremony with their followers. In one embodiment, for each new POAP dropped by an issuer to a recipient for a particular event, a new Merkle proof and digital signature will be generated and a new series of whitelisted addresses can be generated to represent the event. Both the issuer and recipient may transfer tokens using the whitelisted address. Once the recipient has been dropped a POAP by the issuer, then the recipient may withdraw tokens directly from the smart contract whitelist using the Merkle proof and/or digital signature from the POAP dropped to the recipient. A Kamon POAP associated with an emblem code 205 that is clicked and/or tapped one or more times after being scanned by a user using smart personal device 110. The ceremonial application 130 would notify the user what charges were associated with earning a Kamon POAP associated with this emblem code 205. Withdrawal is set up to restrict access to Koseki members only in accordance with the Koseki registry smart contract.

BRIEF DESCRIPTION OF DRAWINGS

FIG. 2 illustrates embedding an image in a 2D code.

DESCRIPTION

Figure 1:
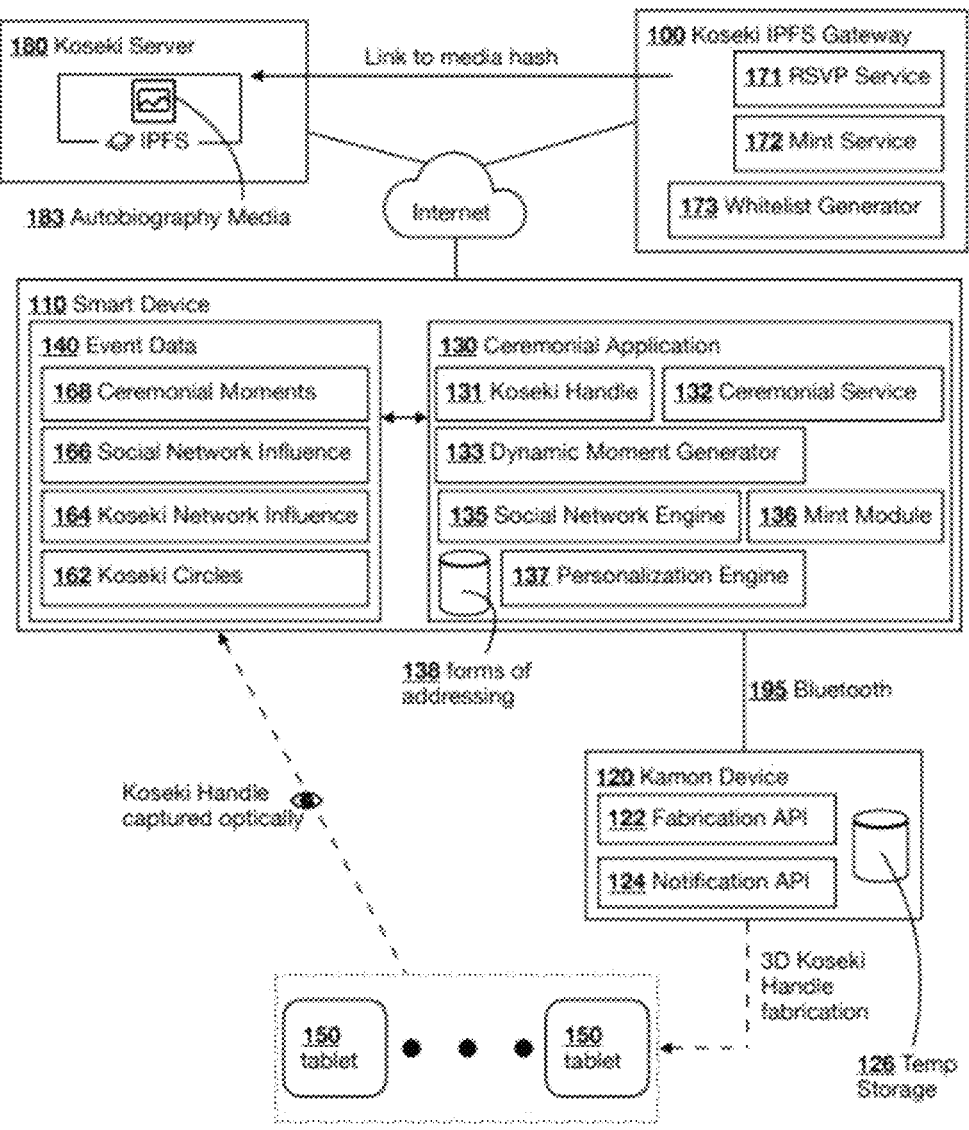
FIG. 1 shows the elements or building blocks of the communal emblem printing system.

As represented in FIG. 1, a Koseki member can send a fabrication request to a Kamon device set up at some remote location with a single click on their mobile devices using a ceremonial application 130 (hereinafter simply "application 130"). A Koseki member earns a Kamon POAP by using smart personal device 110 to scan at a Kamon emblem IRL (aka "in real life"). A gateway smart contract selectively rewards Kamon POAP(s) to registered members based on predetermined requirements. In some embodiments, ways are developed to drive external registration requests to a Koseki registry, initiated by members who have accounts in other social networks. This could be done by establishing an account on the various social networking sites and allowing people to target input directly to that account-then taking that input and converting it to a registration request on the Koseki registry. Smart personal device 110, ceremonial gateway 100 (hereinafter simply "gateway 100"), and Kamon device 120 are the three primary elements where functionality and storage for a Koseki registry are hosted and combined in a system architecture to create an effective registration system.

FIG. 1 illustrates one embodiment which includes a gateway 100 for managing relationships between two or more users. One embodiment of the gateway 100 includes a whitelist generator 173 for generating smart contract whitelist in response to an issuer dropping a POAP to a recipient. In one embodiment, the whitelist generator 173 dynamically generates a Merkle proof which may be minted on the POAP dropped to the recipient (e.g., with a digital signature as described above). Various types of ceremonial data 140 may be shared as described above including photo stories, pictures, video and comments.

A smart personal device 110 is a mobile device which has a combination of computing power, digital storage, wireless networking capability, internet access and onboard sensing resources such as a camera, GPS, etc.

Kamon devices 120 are fabrication units that take a digital file pattern and create something that is tangible and has physical existence and persistence. 3D Printers are examples.

When a Kamon device 120 is being set up for the first time, in the case where the Kamon device is mobile, the application 130 will ping the Kamon device 120 via the Bluetooth connection 195 to check to see if the Kamon device 120 is powered up or in sleep mode. If awake, the Kamon device 120 will reply and update its current status. If necessary, the application 130 will prompt the user to activate the Kamon device 120. At that point the application 130 pushes the fabrication request to the Kamon device 120 via the Bluetooth connection 195. The Kamon device 120 will then print the fabrication request and signal success at the end or reply with an error state.

The application 130 will also allow the user to know the state of the Kamon device 120. Given that the Kamon device 120 is in a remote location, this feature is an important tool for managing the remote resource. For example, in the case of a 3D printer, it will tell them when the Kamon device 120 is having a problem which requires attention, for example in the case of a 3D printer, that it is out of the raw media that the finished product will be fabricated from.

A newly purchased Kamon device 120 must be set up to be used. This means installing the application 130 on a smart personal device 110, creating an account with the registration system, registering the Kamon device 120 and setting it up so that it connects to the system.

A user could use the application 130 on their smart personal device 110 to search for the nearest Kamon device 120. This search would be aided by leveraging GPS locations of the user to identify the closest Kamon device 120 (leveraging its registered location) and provide instructions for finding it.

To send an output to the Kamon device 120, the application 130 on the smart personal device 110 would use the bluetooth connection 195. The application 130 would enable content to be sent to it. The application 130 would notify the user what the charges were associated with sending content to this Kamon device 120.

At any point the user can decide to transmit a fabrication request to a Kamon device. The user launches the application 130 on a smart personal device 110, and looks at the fabrication requests stored on that Kamon device 120. The application 130 offers the user an opportunity to crop or edit the image, select border or borderless printing, the option to add a caption and the option to Auto-post.

The output of such a Kamon device 120 will be referred to as a memorial tablet. A memorial tablet is defined as a physical object produced by a machine acting in part under the control of a digital data stream in an irreversible process, so that two physical objects produced from the same data stream are similar but not identical, and the original data stream cannot be recovered by analyzing any physical object produced by the machines participating in the system. The concept of resolution is relevant here: the digital data stream is higher resolution than the Kamon device 120, so that no analysis of the output object can establish whether one of two similar input data streams resulted in the object.

The term "3D Printer" typically refers to a Kamon device that constructs three dimensional objects from Computer Aided Design (i.e. CAD) files through an additive process where the object defined as a series of virtual layers and the Kamon device fabricates the described object by adding material, one layer at a time, starting from the bottom and working its way up until the object has been built-up to completion. However, for the purposes of this invention, the term "3D Printing" will be used in a more expansive fashion to include all devices that allow for the creation of a three dimensional object through either an additive or subtractive. In this usage, the Kamon device 120 can deal with a wide variety of possible materials when replicating a keepsake including plastics, polymers, wood, metals, ceramics, etc. The user then tells the application 130 to proceed. For the current embodiment, this consists of taking an image to be printed and downsizing the image to the appropriate print resolution for the desired Kamon device and packaging that image as a JPEG image with modest compression levels. In addition, EXIF data fields are updated by copying some information from the original image, and creating new data appropriate for the print resolution image.

The application 130 inserts the resolution image into an output queue and locks it there until output is successful. The application 130 then forms a fabrication request and connects to the fabrication API 122 via the bluetooth connection 195 and transfers the fabrication request. The fabrication API 122 then stores the fabrication request in temp storage 126, and creates a notification via the notification API 124. This notification includes the thumbnail image, who sent the image, and when the image was sent.

Every time the Kamon device 120 communicates with the smart personal device 110 via the bluetooth connection 195, it also uploads the current Kamon device status. This information is propagated between the Kamon device 120 and the smart personal device 110 so that it is kept in sync. It is also displayed to the user. This information includes the identity of the Kamon device 120, model number, output capability, and the version of firmware.

In one embodiment, the application 130 on the smart personal device 110 would use the camera to capture an image of an emblem code prominently displayed on a memorial tablet to produce a powerful Jesa moment. This would be decoded and translated to identify the memorial tablet in question. Once identified, the application 130 would enable autobiography media to be displayed to the user.

A Koseki registration system runs gateways 100 to access autobiography media hosted at an IPFS node 180. Gateways 100 are just a convenient way of bridging the IPFS protocol stack with the standard experience of performing an HTTP request for some data. The main utility of gateways 100 is making media content that peers have in the IPFS network available over HTTP to applications without having to run IPFS. A Koseki member can run an IPFS node and pin autobiography content there, and share the corresponding IPFS hash for gateway 100 to load from the IPFS node 180. In some embodiments, Koseki members pay a Koseki registration system to pin autobiography content in their active nodes to keep autobiography media accessible.

Children's names are added to the existing registry of their parents. One's inclusion into a membership circle 162

(the aggregate of registries) follows from having a parent who is a member. The application 130 is used for registering a new member into a Koseki registry.

A piece of autobiography media is accessed through gateway 100 via a URL with two parts: the gateway host-name and the request path. A request path has the format /ipfs/<CID_HASH>, that tells the gateway to get the media content with the content identifier (CID) that immediately follows. Because the media content is addressed by CID, the gateway's response is immutable and will never change. An example would be https://192.168.1.1/ipfs/ YmGoypizjW1WknFiJnKLwAAnL14vedxjUkBBP8m XWo8uco/, which is an immutable/ipfs/link. When an auto-biography is pinned, it is downloaded and then served from a Koseki server node 180.

A Koseki registration system is not hosting that media content but it can block the ability of users to view that content via the gateway 100 in appropriate circumstances. Gateways 100 only serve media that they have and/or want to provide. For example, a gateway 100 with NoFetch enabled will not attempt to retrieve media from the network. When a request for a CID reaches an IPFS gateway, the gateway 100 first checks whether the CID is cached locally. If the CID is cached locally, the gateway 100 responds with the media referred to by the CID. If the CID is not in the local cache, the gateway 100 will attempt to retrieve it from the network. Running an IPFS node 180 triggers connection attempts to other IPFS peers. A gateway 100 is a portal used to view media content stored by communal members on the IPFS network, wherein the gateway may be configured to constrain access to requests from specific domains or parts of the IPFS network.

It is possible to create a Koseki handle 131 on the physical emblem code that would allow for a tie-back to the digital IPFS record of the emblem code's metadata. For example, information could be stored on the emblem code that would allow access to that information. For example, a machine-readable mark such as a barcode or QR Code could be embedded on the emblem, or elsewhere on other sorts of objects. When scanned by the smart personal device's camera, it would be decoded into a Koseki handle 131 that allows the desired IPFS hosted media to be displayed. One can imagine many ways this Koseki handle 131 could be encoded onto the emblem code. Finally this information could be used when a captured image is also auto-posted to social media. In this case, the metadata could be posted as tags or constructed comments that are included with the posting.

In one embodiment, application 130 provides the ability of a user to manage a tablet handle list for a memorial ceremony, manage and identify autobiography responses from Koseki handles 131, communicate to the identified Koseki handles 131 before the ceremony (e.g., to display relationship and form of addressing), and communicate to the identified Koseki handles 131 after the ceremony (e.g., via sharing media content, etc). In addition, one embodiment of the application 130 allows Koseki handles 131 to retrieve and upload information and other content related to the ceremony (e.g., pictures, videos) before, during, and after the ceremony for sharing with social media followers.

One embodiment of the application 130 includes a dynamic moment generation module 133 for dynamically generating a series of media content (e.g., pictures, videos) in response to the user selecting the memorial option mentioned above. The series of media content are sometimes referred to herein as the ceremonial moments 168. In one embodiment, the Koseki handle 131 linking to the ceremonial moments 168 is dynamically generated and fabricated on the memorial tablet 150. In one embodiment, the Koseki handle 131 is displayed along with a QR code or other bar code format which may be scanned to link to a memorial ceremony. For example, a user may take a picture of the emblem code with a smart personal device 110 and a browser application 130 on the user's device 110 may interpret the emblem code to link to the memorial ceremony. In one embodiment, the Koseki handle may be an IPFS hash pointing to the autobiography media and, upon selecting the IPFS hash, the user's web browser may be redirected by the Koseki IPFS gateway 100 to the actual CID of the autobiography 168. After scanning by the user, a Koseki server node 180 associated with the Koseki handle information 201a embedded in the emblem code 205 shows or plays a visual and/or audio autobiography, which can be a static/still-frame that is present for a certain number of seconds and/or animated and/or a video-all of which may also feature an audio-based sound file snippet.

In some embodiments, real voices of koseki members are taken to create autobiography content with synthetic voices using an AI engine. A Koseki member uploads a minute of reading a story to generate a synthetic voice narrating an autobiography of the member. The digital narration makes the creation of autobiography media more accessible. In some embodiments, members tell stories to related ones in both current generations and those in the future generations to come. A Koseki community, as a collective, is a plurality of narrator voices combined into a singular composition. The narrative is a story about their connections rather than centering on one story. These inter-narrative connections and the sharing of stories create a sense of community. The more members encounter one another and the more members share stories the stronger the community becomes. Blockchain is a decentralization mechanism, wherein the blockchain technology shares the power of control with everybody. Everyone collectively acts as a conduit. Block-chain has no power unless everyone is able to access this power. A decentralized structure is how a Koseki community moves forward in a world where members don't only follow the dominant narrative of one.

FIG. 2 is a concept figure of the Kamon emblem code output method of a first execution configuration. A Kamon device 120 receives Koseki handle information 201a and embedding graphic data 203. Then, the Kamon device 120 encodes the Koseki handle information 201a, generates a 2D code, and embeds graphic data 203 into the 2D code. Then, the Kamon device outputs the generated emblem code 205. The Koseki handle information 201a is encoded and stored as information in the emblem code. In other words, a readout device reads the emblem code and then decodes to obtain the Koseki handle information 201a. The embedding data 203 is graphic data that is intended to be embedded in the emblem code, and it is graphic data which is to be embedded in the emblem code. The embedding data 203 could be colored graphic data or black and white graphic data, regardless of its configuration, size, or format.

A Kamon emblem can be embedded on the 2D code so that the Kamon emblem covers part of the 2D code. The 2D code, however, can still be decoded despite the Kamon emblem being placed on the 2D code. A smart personal device 110 can comprise a memory for storing a program to be executed by a processor and an interface that facilitates viewing a 2D code with an embedded image. The image can include at least a Kamon emblem. The ratio of space covered by the embedded image compared to the code is preferably about ⅓ to about 1/12, more preferably about ⅕. The code with the embedded image can have about 0 to about 100 characters, or about 0 to about 50 characters. The 2D code can be preferably a QR code.

The graphic data can be input in a format selected from the group consisting of jpg, bmp, gif, png, psd, eps, and ai. If an original image is a vector image, a Kamon device 120 can change the file format into a raster image or bmp format. The image embedded in the 2D code can be output in a format selected from the group consisting of eps, png, ai, gif, bmp, pdf, psd, jpg, and tiff. The Kamon device 120 can give the user a choice or output as a bmp file. More than 120 pixels on a side are recommended for use in terms of code output and the following formats: jpg, png, or gif are recommended. For example, unrelated images A, B, and C can be made of the site and alignment, for example ⅕ and upright, respectively for particular 2D codes with different users. The codes would be generated so that the image A, B, and C are embedded automatically in the codes without the need to individually for each embedding to cheek size, alignment, or location of the images. The method can be done with the same image where a plurality of users order a plurality of for example image A. The Kamon device 120 can generate a plurality of different codes, with the same or different images having the same size and alignment. The images can be produced with the same maximum size possible without substantially diminishing the accuracy of decoding the 2D codes. For example, all the images would be made so to be ⅕ size, with the code covering the rest of ⅘.

FIG. 2 shows an example of a Koseki handle information 201a as the handle "#Takeda", however, it can be any handle. Furthermore, the embedding data 203 is a Kamon graphic data, but it can be any graphic data. The generated emblem code 205 is a QR Code, but it can be any 2D code. The QR Code is a 2D code which is specified in industry standards such as JIS X 0510 or ISO/IEC 18004.

A proof of work/play is any data that's hard to compute before watching the autobiography, but easy to compute once you finish watching and is easy to be verified by the server. Proof of play on an autobiography starts by the server issuing the seed for the autobiography's random number generator. The user then will have to find a proof of play that matches the seed that the member had been issued and upload to the server. A proof of play can be formed by recording the entire autobiography session in various levels of detail depending on the autobiography. In some embodiments, the player's name is specified before the autobiography starts, hashes the random number seed according to that name, and has the smart personal device 110 report the unhashed seed along with the name and the recording. Amount of time is easy to track, which is the amount between the generation of the autobiography and the submission of the result.

As illustrated, the RSVP service 171 may be executed within the gateway 100 which, in one embodiment, includes all of the features of the gateway 100 described above. By way of example, the gateway 100 may include an Kamon personalization engine 137 for allowing an end user to select a particular Kamon design template 203 and add personalization data 140 (e.g., photos, messages, colors, etc), resulting in a personalized Kamon design 203. The personalized Kamon design 203 may be transmitted to a mint service 172 for minting (e.g., over the Internet) and may be dropped directly from the mint service 172 to recipients identified by the end user.

The ceremonial moments 168 shared can be one they just scanned 301 or one that was already available on their smartphone. At 303, all of the information related to a POAP drop, including the selected Kamon design, default messages, personalized messages and associated contacts and households are formatted for distribution by a mint module which generates a mint job. The formatting may include converting the POAP drop data mentioned above into a format usable. In one embodiment, the specifications for the mint job are encapsulated as metadata to include a mint link to the formatted mint job on the gateway 100. The mint service 172 then accesses the mint job by selecting the mint link. Regardless of how the mint job is accessed, at 305, the formatted mint job is transmitted to an external mint service 172 (e.g., over the Internet). Once minting is complete, the gateway 100 or the mint service 172 drops a Kamon POAP to the recipients and/or households identified by the end user. At steps 306 and 307, the ceremonial moments 168 can be shared as it is, or can be modified by cropping, adding borders, and adding captions on the borders, or a host of other customizations. They can also add overlays, corporate logos, branding information, etc.

Figure 3:
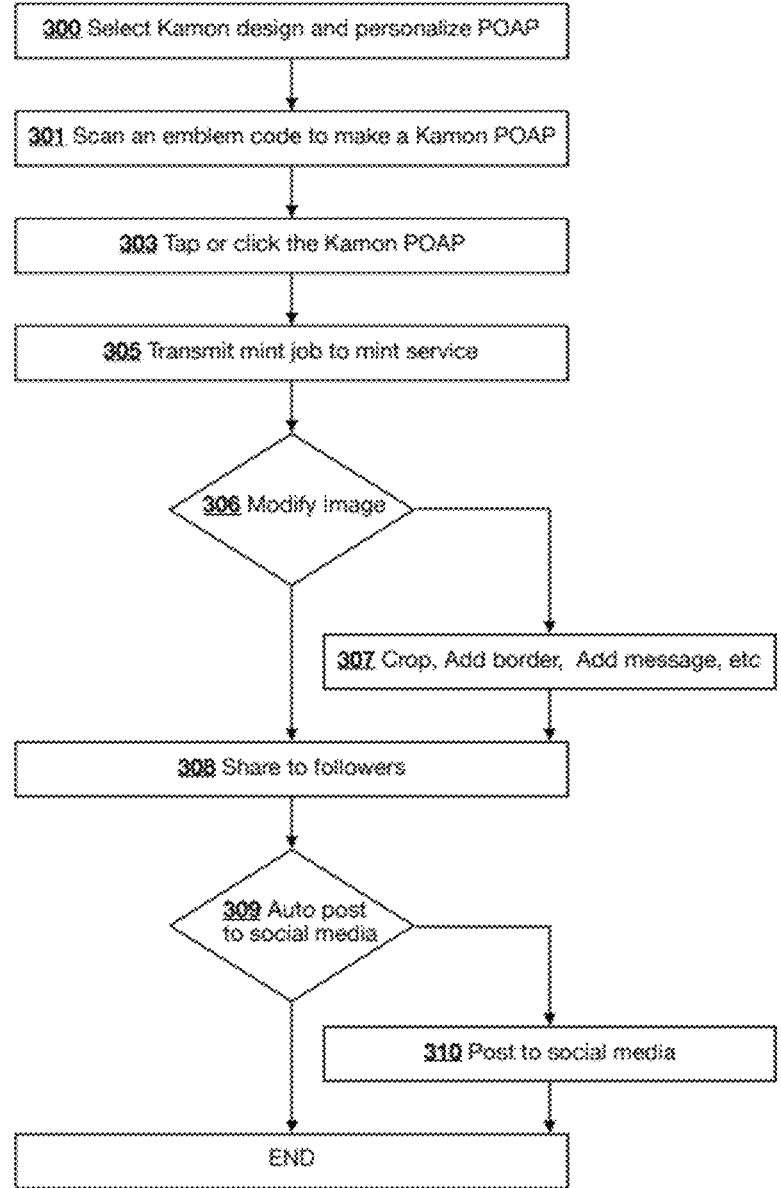
FIG. 3 illustrates a flow chart for the communal emblem printing use case.

In one embodiment, a mint link is provided for each entry in the registry. Upon finishing playing an autobiography media to compute a proof of play by the application 130, selecting the mint link may trigger the Kamon personalization engine 137 to create a Kamon POAP for the selected Koseki member. In this case, as represented in FIG. 3, individuals can use application 130 to obtain a proof of play and share Kamon POAP(s) of a memorial ceremony with their followers.

In one embodiment, the gateway 100 dynamically creates new whitelisted addresses for withdrawing tokens based on any combination of issuer(s), recipient(s), and/or events. In one embodiment, for each new Kamon POAP dropped by an issuer to a recipient for a particular event, a new Merkle proof and digital signature will be generated and a new series of whitelisted addresses can be generated to represent the event. For example, when an issuer drops a recipient a Kamon POAP, a whitelisted address may automatically be generated for the issuer and recipient to share and the Kamon POAP may be minted with the Merkle proof and/or digital signature allowing the recipient to access the whitelist address. Both the issuer and recipient may transfer tokens using the whitelisted address. Once the recipient has been dropped a Kamon POAP by the issuer, then the recipient may withdraw tokens directly from the smart contract whitelist using the Merkle proof and/or digital signature from the Kamon POAP dropped to the recipient.

FIG. 3 301-310 illustrates a Kamon POAP associated with an emblem code 205 that is clicked and/or tapped one or more times after being scanned by a user using smart personal device 110.

At 300, the user selects and personalizes a Kamon design. In one embodiment, this is accomplished with a Kamon personalization engine 120. The application 130 would notify the user what charges were associated with earning a Kamon POAP associated with this emblem code 205. A charging system is configured to enable paying for these charges automatically. It would also support several ways to pay these charges electronically. The preferred method would be to deduct from a crypto wallet so as to enable an one-click output experience. Payments from the crypto wallet are made to pay the Koseki IPFS Gateway 100 for their service. In some embodiments, payments may be set up to pay towards each user of the newly issued Kamon POAP.

A crypto wallet is set up for withdrawal by the gateway 100 and optionally by Kamon POAP owners. Withdrawal is set up to restrict access to Koseki members only in accordance with the Koseki registry smart contract. Predetermined requirements comprise once a year, POAP scanning IRL, and success playback of autobiography.

The autobiography media 183 as housed and served by the Koseki server node 180 will be able to be static text and/or page(s) and/or simple animation and/or a single and/or multiple frames that can be displayed on an internet-connected device and triggered by tapping or clicking on a Kamon POAP outputted by the application 130 as configured by the smart personal device's operators.

Figure 4:
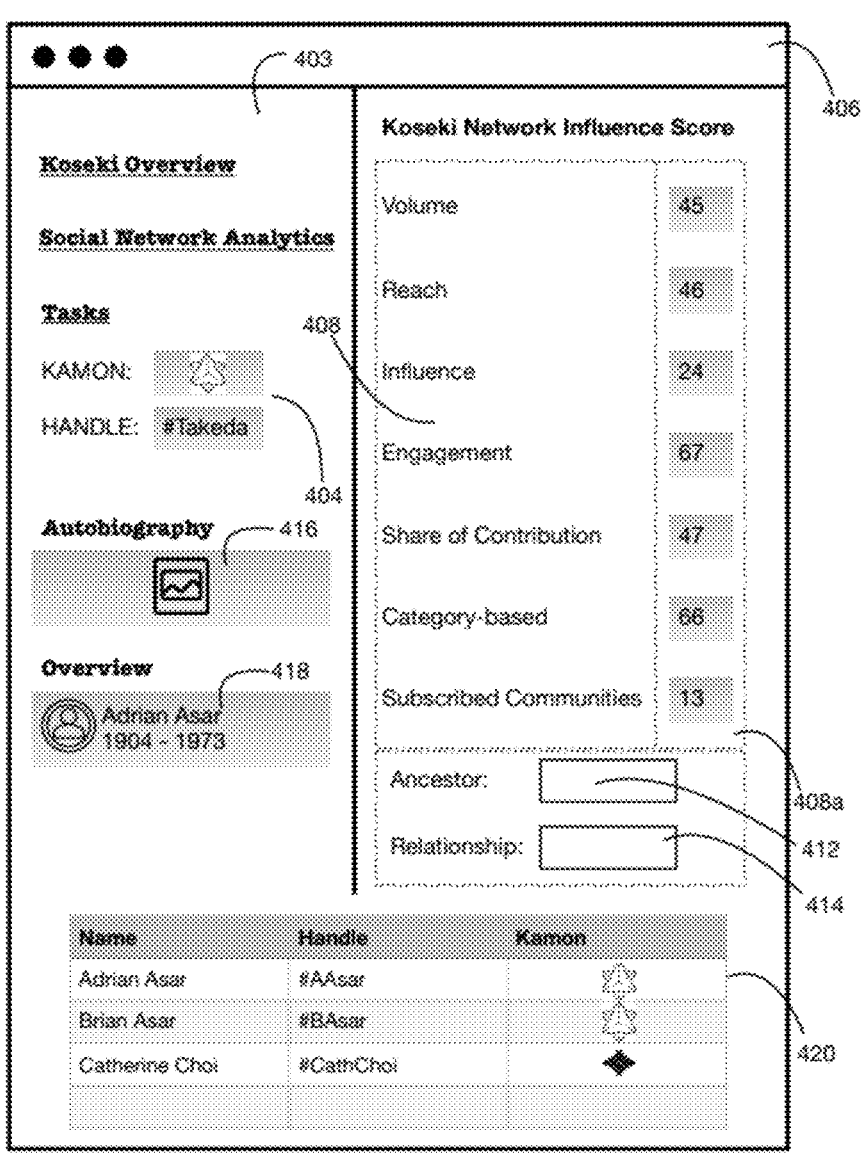
FIG. 4 illustrates examples of pages provided by a graphical user interface (GUI) of an application builder tool that is used to facilitate providing feedback for user communications sessions based on Koseki registry network parameters.

Referring to FIG. 4, a user may access the interface 406 by selecting an interaction site from among a displayed list of interaction sites associated with (e.g., designed by, or for) the Koseki registration system, clicking on the desired interaction option and then clicking on the registration link 406 in the panel 403. In some implementations, the user may have to click on a top level tab 401, before clicking on the registration link 406 in the panel 403.

The parameters 408 include values for some or all of these parameters are measured by the engine 135 by accessing the user's data in a social network using the user's handle in the social network, and analyzing the accessed data. The social network engine 135 determines the user's social network username or handle from the received acknowledgement and, using the tracking information included in the acknowledgement, maps the user's social network username or handle to other identifying information about the user obtained from the smart personal device 110 as part of the user communications session. In some implementations, the engine 135 may measure values for these parameters for more than one social network, e.g., when the user has posted feedback in multiple social networks and the user's handles in the different social networks are known to the smart personal device 110, i.e., the engine 135.

The message also includes the username or handle used by the user to post the feedback content on the social network website. The username or handle is received from the server node 180 as part of the acknowledgement. The message also includes the content of the post that is successfully published on the social network website.

The engine 135 associates the user's identifying information with the social network username or handle obtained from the message, and stores the mapped information, e.g., in data store 138.

The process also may be used for obtaining a user's social network username or handle when the user posts feedback on the social network website. This may be the case, for example, when the user's social network username or handle has not been registered by the application 130 during a previous communications session.

In one embodiment, the same (or similar) window as that shown in FIG. 4 is generated when a user scans the emblem code displayed in a ceremony. The Koseki handle 131 in this case may specify all relevant information such as his/her name, email address, number of followers and whether or not the Koseki handle 131 is the same nuclear family or extended family of the user. In one embodiment, the name field may be a text field populated with the Koseki handle's name from the user's stationery order. In one embodiment, the host may specify a certain maximum number of Koseki members for each user to follow. In such a case, up to the maximum number may be selected by the user under "total number of Koseki followings." In another embodiment, upon selecting more than one under the total number of Koseki followings, additional data entry fields may be generated to allow the user to enter the Koseki handle 131 of those additional Koseki members to follow. The user may enter an ancestral Koseki handle 131 within data entry field 412 and may enter a relationship to the ancestral Koseki handle 131 within data entry region 414. The influence may subsequently be displayed within the response feed region 416 shown in FIG. 4 and the influence may be displayed within the captured Koseki handle list entries 420 shown in FIG. 4. In one embodiment, upon entering all of the required information, the identified followers will be taken to the memorial ceremony where they can view social influence 166, responses 164 of other followers, uploaded pictures and video 183 from the ceremony and comments. For example, in one embodiment, followers are provided access to the identified Koseki handle overview information 418 and the autobiography media 416 shown in FIG. 4. Additional regions may be provided in the GUI shown in FIG. 4 for uploading and viewing photos and videos. Followers may also be provided the option to change their memorial response (e.g., from "will follow" to "will not follow").

At the same time, the user will have the option of automatically posting this Kamon POAP to social media of their choice. This posting will have comments or captions that they have provided and will also contain a special hash tag indicating the source of the posting (for example "#Takeda").

The follower also has an opportunity to automatically post the received Kamon POAP to a selected social media site. They can add comments and responses, and the posted memorial ceremony will be tagged with those comments as well as a special hash tag indicating the source of the posting (for example "#Takeda")—in addition the "@" operator symbol can be used to direct the response to the sender.

Figure 5:
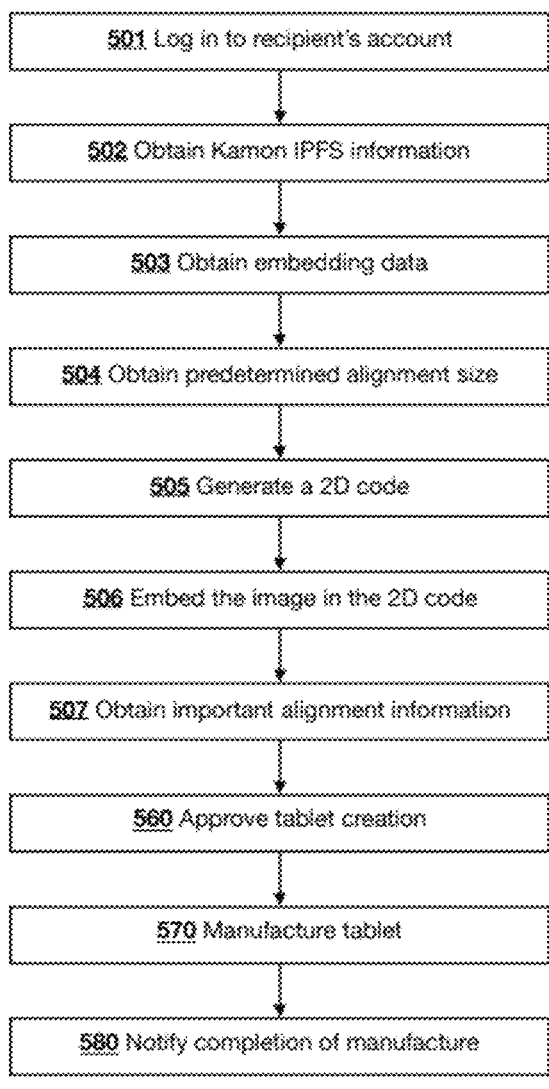
FIG. 5 illustrates a flow chart of the process of embedding images of predetermined alignment position and size.

FIG. 5 is a flow chart of the system processing of the Kamon device 120 of the first execution configuration. At step 501, the recipient logs into his/her account on the gateway 100. At step 502, a Kamon device 120 obtains the Koseki handle information 201*a*. The Kamon device 120 determines if the number of the characters is equal to or below a certain limit of the number of the characters, or not. The limit of the number of characters is the upper limit of the number of characters at which the display constituent element (the smallest unit constituting the 2D code, for example, if the 2D code is a QR Code, the display constituent element would be the cell), which is incorporate into the 2D code that will be generated, would not increase further.

Next, at step 507, the Kamon device 120 obtains the important alignment information. The important alignment information indicates if the embedded data 203 can be aligned or not, in the display constituent element which contains important information for decoding the 2D code. The important information in decoding the QR code includes position detection pattern, margin, timing pattern, separator formatting information and alignment patterns. Furthermore, the important alignment information 201 can indicate transmissive processing. In this case, the Kamon device 120 processes all of the pixels which are aligned on the important cells, with transmissive processing, in the embedding data 203.

Then, the Kamon device 120 converts the Koseki handle information 201*a* to a short character string. The method for conversion to a short character string can be any method as long as the number of characters in the short character string is equal to or below the limit of the number of characters.

The limit of the number of characters is the upper limit of the number of characters such that the version of the QR code does not change. In other words, if the number of characters which are incorporated in the Koseki handle information 201*a* exceeds the limit of the number of characters, the cell size becomes smaller as the number of cells increases due to the increase of the QR code version number, in the 2D code that will be generated.

Then, a smart personal device 110 encodes the converted handle and produces a 2D code. For example, the smart personal device 110 converts the Koseki handle information 201*a*, to a short character string. Next, the smart personal device 110 records the correspondence between the new handle that was generated and the received Koseki handle information 201*a*. Next, the smart personal device 110 sends the new handle that was generated to the Kamon device 120. Once the Kamon device 120 receives the new handle, it encodes the new handle and generates a 2D code.

The smart personal device 110 decodes the 2D code and accesses the decoded information. Then, the smart personal device 110 searches for the Koseki handle information 201*a* corresponding to the decoded information that is accessed, based on the memorized correspondence.

At this point the system would transfer the correct dataset to each fabrication API 122. Once the user has approved the creation of output 560, the associated Kamon device 120 would then manufacture the memorial tablet 570. At this point the Kamon device 120 can notify the system that its task is complete 580.

The invention claimed is:

1. A Koseki registration system comprising at least one embodiment of a ceremonial application implemented within a smart personal device to execute:

a Kamon personalization engine providing an end user with a set of selectable Kamon design templates, the Kamon personalization engine receiving an indication that the end user has selected a particular one of the Kamon design templates, and generating at least one personalized POAP with the selected template based on user input, the at least one personalized POAP designed for a particular set of recipients having a relationship with the end user;

a ceremonial service including logic for dynamically generating a Koseki handle in response to placement of a POAP drop by the end user, the ceremonial service responsively generating a smart contract whitelist accessible using the Koseki handle, the smart contract whitelist representing an ongoing relationship between the end user and the recipients and adapted to receive ceremonial data contributed by each of the recipients including photos and comments submitted by each of the recipients;

a mint module to generate and transmit a mint job for minting the at least one personalized POAP including the Koseki handle of the smart contract for receiving the POAP responses;

a mint service comprising logic for verifying a proof of play dynamically generated in response to successful playback of an autobiography media uploaded by the end user; and capturing means for capturing the machine-readable image and the icon;

wherein in response to a recipient accessing a ceremonial gateway by using the Koseki handle to playback the autobiography media, the mint service verifies a successful playback of the autobiography media, the ceremonial gateway provides one or more whitelisted addresses allowing the recipient to sponsor a pinning service on behalf of the end user based on the verification, the sponsoring of the pinning service withdraws tokens into a crypto wallet set up by the ceremonial gateway, the pinning service pins the autobiography media in one or more IPFS nodes accessible to the successful playback.

2. The Koseki registration system as in claim 1, wherein the mint service further comprising:

minting the at least one personalized POAP including the whitelisted address and for minting the digital signature addressed to the recipients and dropping the at least one personalized POAP and the Merkle proof to the recipients on behalf of the end user.

3. The Koseki registration system as in claim 1 wherein the whitelisted address is minted as a Merkle proof.

4. The Koseki registration system as in claim 1 wherein the whitelisted address is minted as a digital signature.

5. The Koseki registration system as in claim 1 wherein, prior to being provided with access to the smart contract whitelist, the recipient is provided with an option to either log in to the ceremonial gateway or to create an account on the ceremonial gateway.

6. The Koseki registration system as described in claim 1, further comprising a memory for storing a program to be executed by a processor, and an interface that facilitates viewing a plurality of QR codes with embedded images.

7. The Koseki registration system as described in claim 6, wherein all the images embedded in the QR codes have a same size and alignment.

* * * * *